United States Patent
Nishimura et al.

(10) Patent No.: US 8,669,877 B2
(45) Date of Patent: Mar. 11, 2014

(54) OIL LEVEL INSPECTION SYSTEM FOR RAILROAD CAR TRUCK USING IMAGE PROCESSING

(75) Inventors: Kyouichi Nishimura, Nagoya (JP); Nozomu Nakamura, Nagoya (JP); Kazuhiro Okada, Nagoya (JP); Yoshitaka Tanaka, Nagoya (JP)

(73) Assignee: Central Japan Railway Company (JP)

( * ) Notice: Subject to any disclaimer, the term of this patent is extended or adjusted under 35 U.S.C. 154(b) by 349 days.

(21) Appl. No.: 13/132,595

(22) PCT Filed: Dec. 3, 2009

(86) PCT No.: PCT/JP2009/070337
§ 371 (c)(1),
(2), (4) Date: Jul. 19, 2011

(87) PCT Pub. No.: WO2010/064689
PCT Pub. Date: Jun. 10, 2010

(65) Prior Publication Data
US 2011/0270611 A1    Nov. 3, 2011

(30) Foreign Application Priority Data

Dec. 3, 2008    (JP) ................................ 2008-308540

(51) Int. Cl.
*G08B 21/00*    (2006.01)

(52) U.S. Cl.
USPC ....................................... 340/618; 340/450.3

(58) Field of Classification Search
USPC ................ 340/450, 450.1, 450.2, 450.3, 618; 105/96, 157.1; 301/124.1–137; 384/158

See application file for complete search history.

(56) References Cited

U.S. PATENT DOCUMENTS 6,617,968 B1 *    9/2003    Odisho et al. .............. 340/450.3

FOREIGN PATENT DOCUMENTS

JP    62014376    4/1987
JP    3453637    10/2003

OTHER PUBLICATIONS

English translation of International Preliminary Report on Patentability from corresponding PCT Application No. PCT/JP2009/070337 dated Jul. 14, 2011.
International Search Report from corresponding PCT Application No. PCT/JP2009/070337 dated Mar. 16, 2010.

* cited by examiner

*Primary Examiner* — Jeffrey Hofsass
(74) *Attorney, Agent, or Firm* — Grossman Tucker Perreault & Pfleger PLLC

(57) ABSTRACT

A system for inspecting an oil level in each part of a railroad car truck includes: an imaging unit that obtains an image of an oil level gauge; an oil level inspection unit that inspects whether or not the oil level in each part of the railroad car truck is within a predetermined range based on the image of the oil level gauge obtained by the imaging unit; a voice input unit adapted for an inspector to input, via voice, an inspection result; a voice processing unit that determines whether or not the inspection result inputted via the voice input unit is good based on the inputted inspection result, and converts a determination result into displayable data; a display unit that displays an oil level inspection result and the determination result; and a storage unit that stores, as data, the oil level inspection result and the determination result.

6 Claims, 15 Drawing Sheets

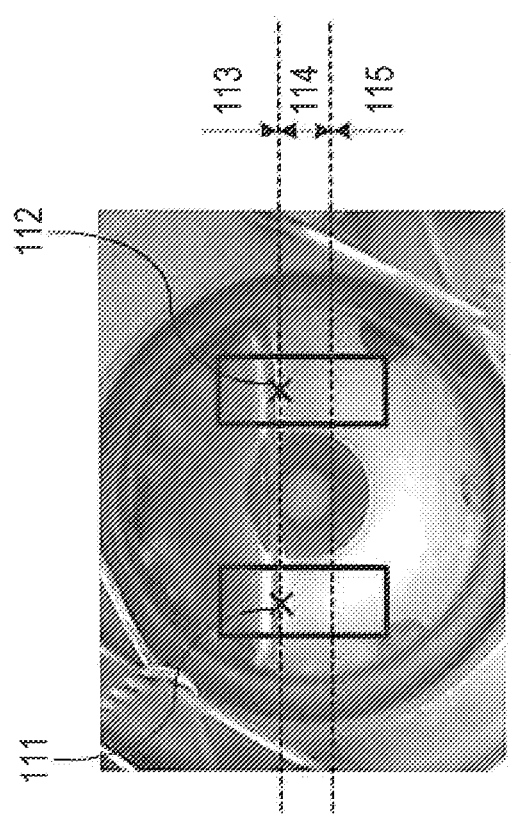

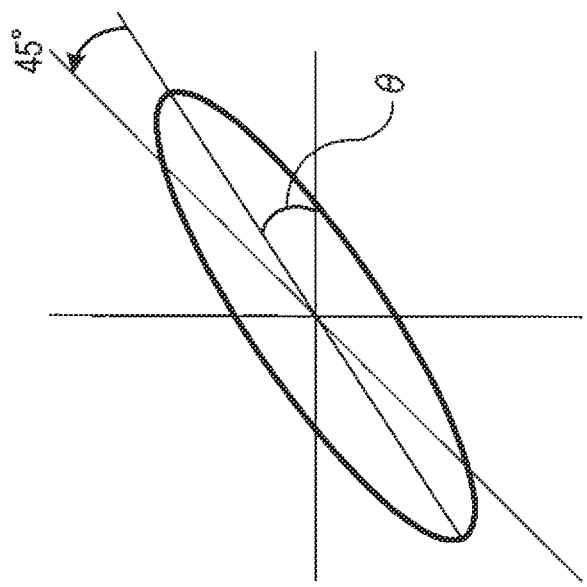
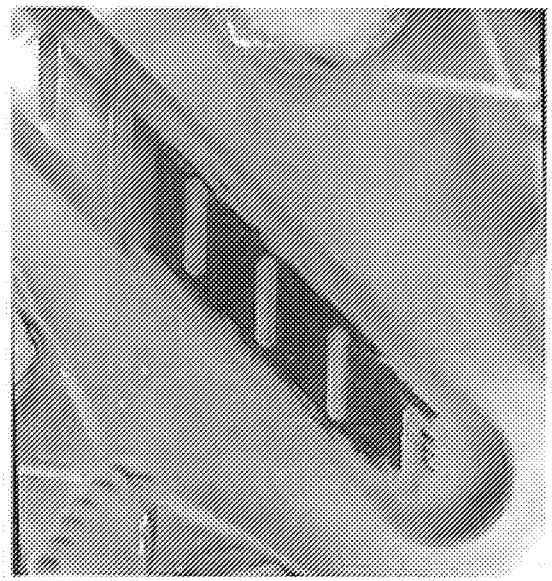
FIG.9

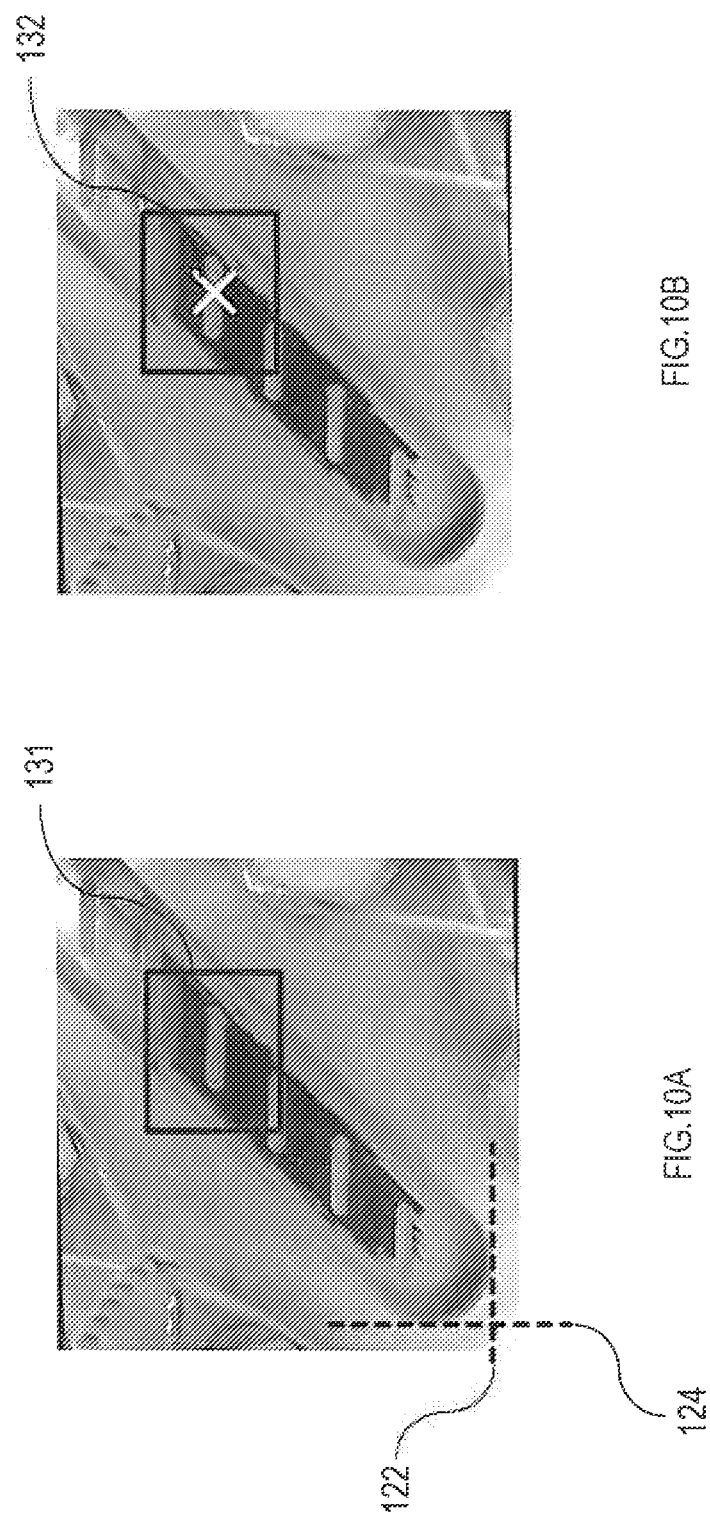

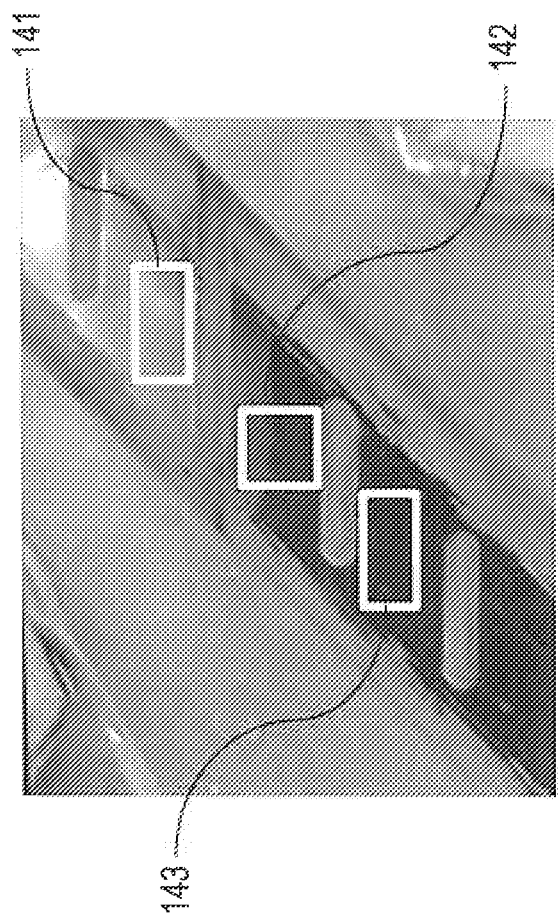

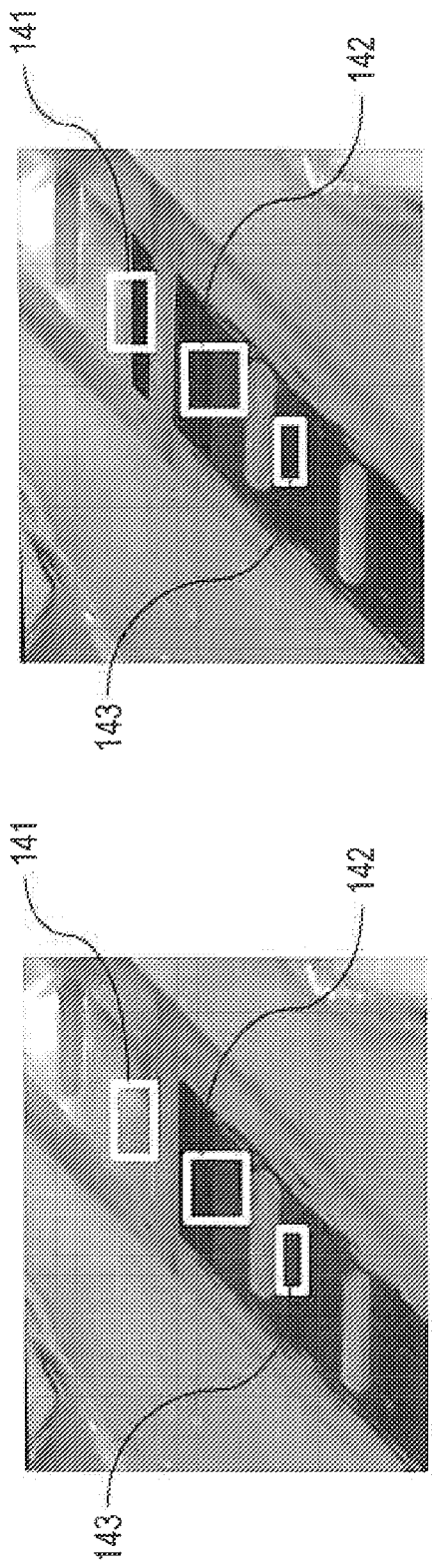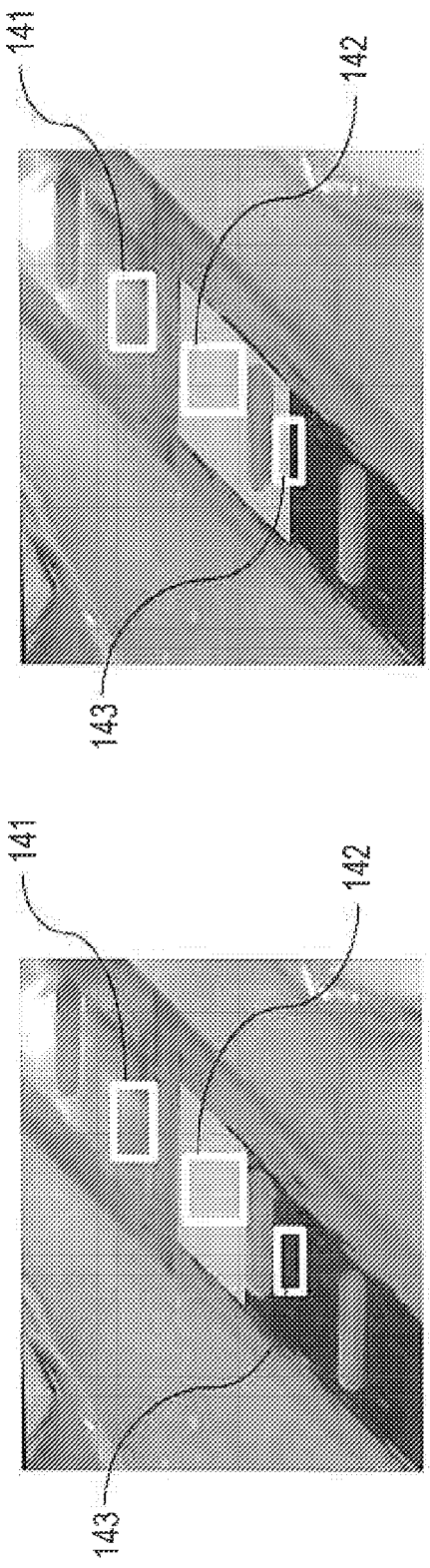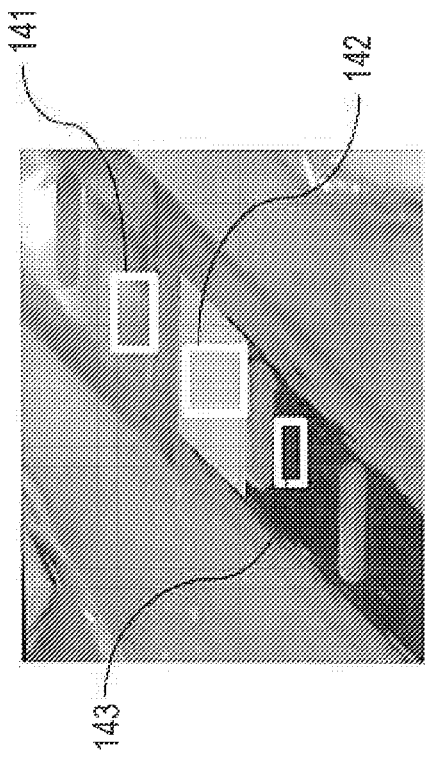

OIL LEVEL INSPECTION SYSTEM FOR RAILROAD CAR TRUCK USING IMAGE PROCESSING

TECHNICAL FIELD

The present invention relates to a system for inspecting an oil level of lubricant oil or operating oil necessary for a railroad car truck.

BACKGROUND ART

A railroad car truck is provided with axle boxes and gear cases for storing lubricant oil necessary for lubrication of axles of the truck, and a hydraulic cylinder for operating a brake. An oil level of the lubricant oil in each of the axle boxes and gear cases and an oil level of operating oil in the hydraulic cylinder are required to be kept at predetermined levels, respectively.

A conventional axle box, gear case, or hydraulic cylinder has an inspection window (an oil level gauge), and an inspector performs a visual inspection of whether or not an oil level is within a predetermined range. The inspector also records on a check sheet whether or not the oil level is within a normal range.

In this connection, there is a system in which an image of an oil level gauge is obtained by a camera and image processing of the image is performed to inspect whether an oil level is appropriate, in order to reduce a burden of an inspector visually inspecting the oil level gauge (see, for example, Patent Document 1).

Patent Document 1:
  Japanese Patent Publication No. 03453637

DISCLOSURE OF THE INVENTION

Problems to be Solved by the Invention

The system in which an image of an oil level gauge obtained by a camera is image processed to inspect whether an oil level is appropriate involves a problem that a spot or flaw on the oil level gauge leads to errors in an inspection result.

Also, a method, in which an inspector records a result of a visual inspection on a check sheet, involves a problem that the method requires the inspector to have the check sheet and fill in the inspection result (for example, place check marks) at the time of the inspection, and thus is inconvenient to the inspector and leads to a low working efficiency.

In addition, the method requires a large storage space since it is necessary to store an enormous amount of check sheets after inspections. A further problem is that it is difficult to search the inspection results.

The present invention, which has been made in view of these problems, has an object to provide an oil level inspection system for a railroad car truck that may achieve an improved inspection accuracy, an improved inspection efficiency by an operator, a reduced storage space for inspection results, and an easy searching of inspection results.

Means for Solving the Problems

A railroad car truck oil level inspection system (1) In this section, reference numerals used in "BEST MODE FOR CARRYING OUT THE INVENTION" are affixed as appropriate to allow easy understanding of the invention. However, these reference numerals are not meant to limit the scope of claims.) in a first aspect of the present invention, which has been made to solve the above problems, includes an imaging unit (10), an oil level inspection unit (20), a voice input unit (30), a voice processing unit (20), a display unit (40) and a storage unit (50).

The imaging unit (10) obtains an image of an oil level gauge provided in each part of a railroad car truck.

The oil level inspection unit (20) image processes the image of the oil level gauge obtained by the imaging unit (10) to thereby inspect whether or not an oil level in the each part of the railroad car truck is within a predetermined range.

The voice input unit (30) is adapted for an inspector to input thereto, via voice, an inspection result after inspecting whether or not the oil level in the each part of the railroad car truck is within the predetermined range.

The voice processing unit (20) performs voice recognition process of the inspection result inputted via the voice input unit (30), to thereby determine whether or not the inputted inspection result is good and converts a determination result into displayable data.

The display unit (40) displays an oil level inspection result obtained by the oil level inspection unit (20) and the determination result obtained by the voice processing unit (20).

The storage unit (50) stores, as data, the oil level inspection result and the determination result converted into displayable data.

According to the railroad car truck oil level inspection system (1) configured as above, an oil level inspection by image processing and a determination based on an inspection by an inspector (for example, a visual inspection) are performed for one oil level gauge. That is, one oil level gauge is inspected by two inspection methods, and thus an improved inspection accuracy may be achieved.

Since the inspection results are displayed on the display unit (40), the inspector may confirm the inspection results. Accordingly, if the inspection result by image processing and the inspection result of a visual inspection are different, the inspector may recognize the difference by viewing the displayed inspection results. In this case, it may be expected that obtainment of an image of the oil level gauge and a visual inspection will be performed again. Thus, errors in inspection results may be suppressed.

Since inspection results are stored in the storage unit (50), it may be possible to save the inspector's labor of filling in the inspection result in a check sheet or the like. Also, the inspector no longer needs to have a check sheet when performing an inspection, and thus the inspector's burden may be reduced and an improved working efficiency may be achieved.

Also, since inspection records are stored as data, use of paper may be reduced and also data may be easily searched by performing a search of stored data.

"Each part of a railroad car truck" here means a part in which lubricant oil or operating oil is stored in the railroad car truck, such as an axle box of the railroad car truck, a gear case of the railroad car truck, or a hydraulic cylinder for operating a brake of the railroad car truck.

The present invention may also be configured such that a result of a processing and a reason for the processing based on the inspection result are displayed and stored as data. In a second aspect of the present invention, the voice input unit (30) further may input, via voice, the result of the processing and the reason for the processing based on the inspection result by the oil level inspection unit or the inspection result by the inspector.

The voice processing unit (20) further may convert the inspection result by the oil level inspection unit, or the result of the processing and the reason for the processing into displayable data.

The display unit (40) further may display the result of the processing and the reason for the processing converted into displayable data by the voice processing unit (20).

The storage unit (50) further may store, as data, the processing unit and the reason for the processing converted into displayable data by the voice processing unit (20).

According to this configuration, not only the inspection results by the oil inspection unit and by the inspector, but also the result of the processing and the reason for the processing based on the inspection results are displayed on the display unit (40) or stored in the storage unit (50). It is, therefore, possible to confirm the result of the processing and the reason for the processing on a site of the processing, and confirm stored results of the processings and reasons for processings after performing inspections, which may be advantageous in inspection management.

Here, "the result of the processing based on the inspection result" means details of a processing performed in accordance with the inspection result, such as replenishing oil in case of an insufficient oil level, draining oil in case of an excessive oil level, based on the result of the inspection by the oil level inspection unit or the result of the inspection performed by the inspector (for example, a visual inspection result).

"The reason for the processing" means the ground (reason) for performing the processing. For example, when oil is replenished due to an insufficient oil level, "insufficient oil level" is "the reason for the processing". When oil is drained due to an excessive oil level, "excessive oil level" is "the reason for the processing".

As mentioned above, a variety of oil level gauges are provided to a railroad car truck. Each railroad car usually has two trucks, and "a train" consists of a number of railroad cars (For example, a Shinkansen bullet train has sixteen railroad cars.). Accordingly, an enormous amount of inspection results are stored in the storage unit (50).

In a third aspect of the present invention, therefore, an input unit (60) to input a keyword for searching and a search unit (20) may preferably be provided. The search unit (20) performs, based on the keyword inputted via the input unit (60), a search of at least one of the oil level inspection results, the determination results (hereinafter, the oil level inspection results and the determination results are also collectively referred to as "inspection results"), the results of the processings and the reasons for the processings stored in the storage unit (50) and displays a search result on the display unit (40).

With this configuration, it is possible to perform a keyword search of data of the enormous amount of inspection results, the results of the processings and the reasons for the processings stored in the storage unit (50) and display the search result on the display (40). Thus, it is possible to easily confirm the inspection results, the results of the processings and the reasons for the processings after inspections. That is, the inspection results, the results of the processings and the reasons for the processings may be easily searched and effectively used also after inspections, and thus an improved working efficiency after inspections may be achieved.

It is further convenient if the inspection result or the like may not only be displayed on the display unit (40) but also be saved in a form of a report. In a fourth aspect of the present invention, therefore, an output unit (70) may be provided. The output unit (70) outputs, in a form of a report, at least one of the oil level inspection result and the determination result displayed on the display unit (40), and the search result searched by the search unit (20).

With this configuration, it is possible to output, in the form of a report, to thereby save at least one of the oil level inspection result, the determination result, and the search result, which is convenient.

The report to be outputted by the output unit (70) may be, for example, a checklist for checking whether the inspection result is "pass" with an added image of the oil level gauge. In this case, since the image remains as evidence as well as the inspection result of pass/fail, the report may be an effective material after the inspection.

When an image of the oil level gauge is obtained by the imaging unit (10), obtainment of the image is performed in a state with the imaging unit (10) located close to the oil level gauge (in a so-called closeup state). Since the truck is in a bottom of the railroad car, brightness is insufficient and therefore lighting on the oil level gauge is required.

However, when light is applied to the oil level gauge, which is constituted by, for example, glass or acryl, the light is reflected at a surface of the oil level gauge. Then, the image may partially include the reflected light, and it may not be possible to obtain an image of the oil level gauge which is suitable for image processing.

In a fifth aspect of the present invention, therefore, a diffusion ring (12) that deflects and diffuses an incident light may be provided around a periphery of a lens of the imaging unit (10). Then, the incident light on the lens of the imaging unit (10) is diffused by the diffusion ring (12), and thereby even and sufficient lighting may be provided on the entire oil level gauge. Thus, an image of the oil level gauge with an even brightness which is suitable for image processing may be obtained.

Since the railroad car truck is in the bottom of the railroad car, a work space is narrow and working efficiency is low during an inspection. Accordingly, the inspector in most cases moves the imaging unit (10) close to the oil level gauge from an oblique direction when inspecting the oil level gauge.

In a sixth aspect of the present invention, therefore, the imaging unit (10) may preferably have a display portion (14) in a side of a body of the imaging unit (10) to display a captured image in a tilted manner relative to the side of the body, in order to obtain the image of the oil level gauge by the imaging unit (10).

With this configuration, the inspector may obtain the image of the oil level gauge viewing the image of the oil level gauge displayed on the display portion (14) even in a space with low working efficiency. Further, a resulting improvement in working efficiency may lead to a reduced burden on the inspector.

BRIEF DESCRIPTION OF THE DRAWINGS

FIG. 7 is a view showing a procedure of determination of a fluid level of an oil level gauge in an axle box.

FIG. 9 is a view showing a procedure of angle correction of an image of the gear case window.

FIGS. 10A-10B are views showing a procedure of detecting a position of a scale image.

FIG. 11 is a view showing a procedure of setting various inspection areas at the oil level gauge in the gear case.

FIGS. 12A-12D are views showing a procedure of determination of a fluid level of the oil level gauge in the gear case.

Figure 1:
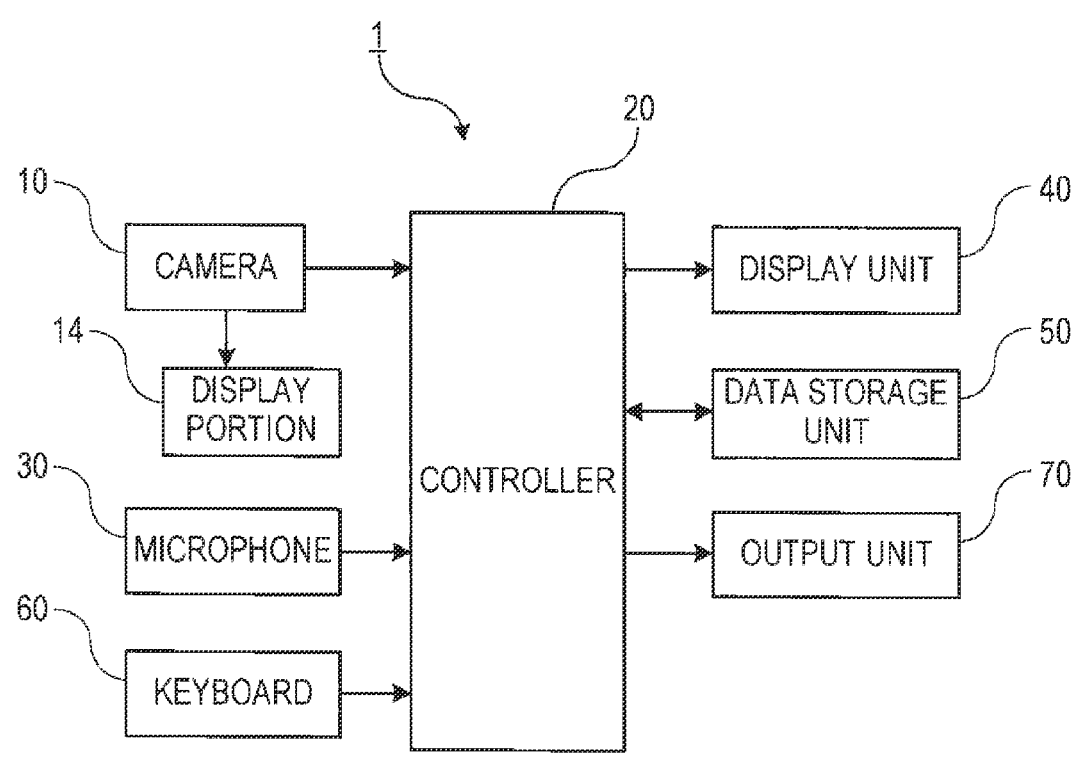
FIG. 1 is a block diagram showing a schematic configuration of a railroad car truck oil level inspection system 1.

EXPLANATION OF REFERENCE NUMERALS 1, 2 . . . railroad car truck oil level inspection system; 10 . . . camera; 12 . . . diffusion ring; 14 . . . display portion; 20, 21 . . . controller; 23 . . . USB cable; 25 . . . HUB; 27 . . . connection unit; 30 . . . microphone; 32 . . . helmet; 34 . . . flexible arm; 40, 41 . . . display unit; 50, 51 . . . data storage unit; 60, 61 . . . keyboard; 70 . . . output unit.

BEST MODE FOR CARRYING OUT THE INVENTION

Hereinafter, embodiments to which the present invention is applied will be described with reference to the drawings. Embodiments of the present invention should not be limited to the hereinafter described embodiments but may be in various forms, as long as within the technical scope of the present invention.

[First Embodiment]

(Configuration of railroad car truck oil level inspection system 1)

As shown in FIG. 1, a railroad car truck oil level inspection system 1 includes a camera 10, a controller 20, a microphone 30, a display unit 40, a data storage unit 50, a keyboard 60 and an output unit 70.

The camera 10 is for obtaining an image of an oil level gauge provided to each part of a railroad car truck. The camera 10, which is constituted by a CCD camera, has an approximately cylindrical shape as shown in FIG. 2 to allow easy holding by an inspector during an inspection.

The camera 10 is USB connected to the controller 20. An image obtained by the camera 10 is transmitted to the controller 20 via a USB cable.

Figure 2:
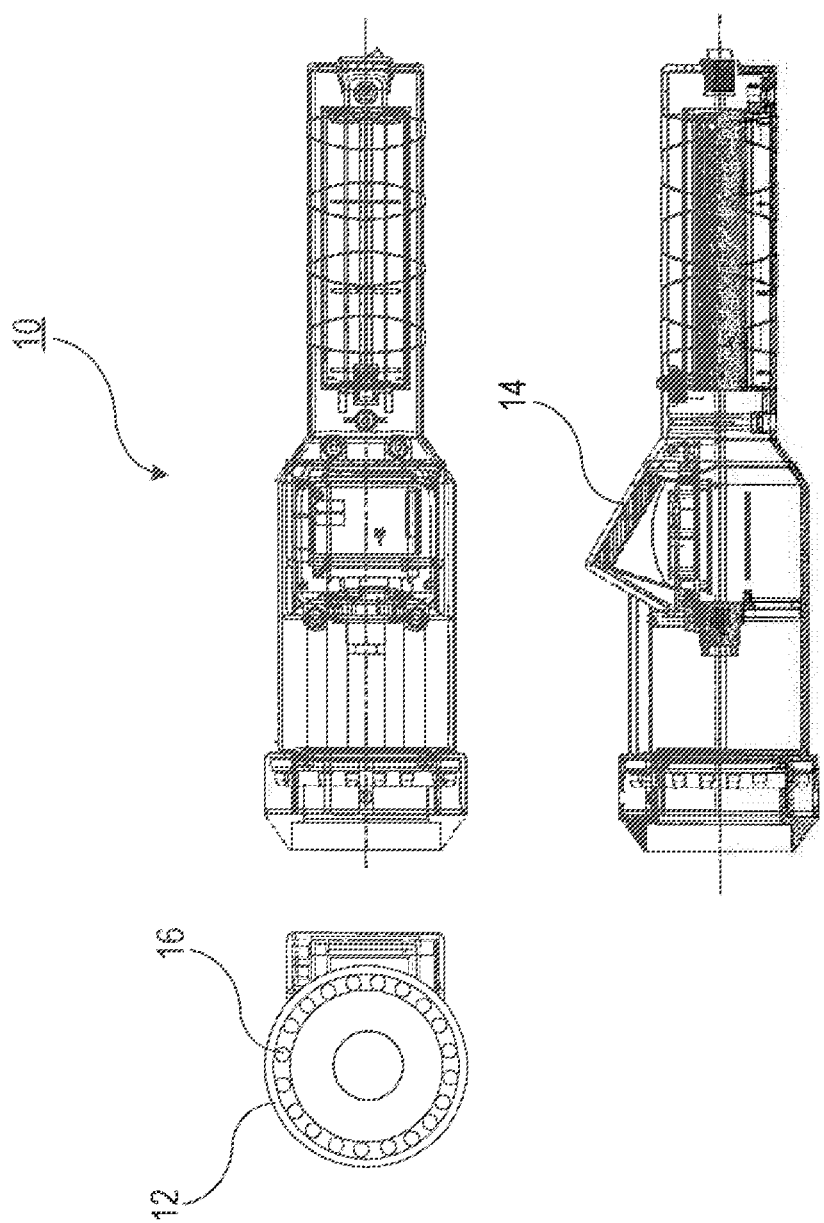
FIG. 2 is an appearance view showing an appearance of a camera 10.

Also, as shown in FIG. 2, the camera 10 has a lot of LEDs 16 for irradiating an imaging target around a lens, and has an acrylic diffusion ring 12 for deflecting and diffusing an incident light around a periphery of the LEDs 16.

Further, the camera 10 has a display portion 14 in a side of a body of the camera 10 to display a captured image in a tilted manner relative to the side of the body. The display portion 14 is constituted by a compact LCD, an organic EL, or the like.

The controller 20 includes a CPU, a ROM, a RAM and an I/O, which are not shown, and executes below-described processes (a) to (e) in accordance with a program stored in the ROM.

(a) Image processing the image of the oil level gauge obtained by the camera 10, and inspecting whether or not an oil level in each part of the railroad car truck is within a predetermined range. Displaying a result (hereinafter, the result is also referred to as the "oil level inspection result") on the display unit 40, and storing the result in the data storage unit 50 (hereinafter, the process (a) is referred to as a "fluid level determination process"). The details of the fluid level determination process will be described later.

(b) Performing a voice recognition process of an inspection result of an inspector's visual inspection which is inputted through the microphone 30, and determining whether or not the inputted inspection result is good. Converting a result of the determination (hereinafter, the result is also referred to as a "determination result") into displayable data, and displaying the data on the display unit 40. Also storing the determination result converted into the displayable data in the storage unit 50. Since the voice recognition process used here is a known processing, no explanation of the details of the processing is provided.

(c) Converting a result of a processing and a reason for the processing inputted through the microphone 30 into displayable data. and displaying the data on the display unit 40. Storing the result of the processing and the reason for the processing converted into displayable data in the data storage unit 50 as data.

"The result of the processing" here means specifics of the processing performed based on the oil level inspection result or the determination result, such as replenishment of oil or drainage of oil. Usually, oil is replenished when the oil level is insufficient, while the oil is drained when the oil level is excessive.

"The reason for the processing" here means the reason for performing the processing. For example, "insufficient oil level" in a case of replenishing oil, "excessive oil level" in a case of draining oil, or the like is "the reason for the processing".

(d) Searching, based on a keyword inputted via the keyboard 60, at least one of the oil level inspection results, the determination results, the results of the processings, and the reasons for the processings, which are stored in the data storage unit 50, and displaying a search result on the display unit 40. Since the searching is a known processing, a detailed explanation of the processing is omitted.

(e) Outputting, in a form of a report, at least one of the determination result displayed by the display unit 40, the search result in (d), and the determination results stored in the data storage unit 50 from the output unit 70 (hereinafter, this process is referred to as a "report output process".).

The microphone 30 is for performing voice-input of information. Specifically, voice-input of the following is performed via the microphone 30: the inspection result of the inspector's inspection based on the oil level gauge, the inspection result indicating whether or not the oil level in the each part of the railroad car truck is within the predetermined range; the oil level inspection result by the controller 20; or the result of the processing and the reason for the processing based on the inspection result of the inspector's inspection. Also, information (voice) for selecting an oil level gauge (in an axle box, a gear case, a pressure intensifier, etc.) as an inspection target is inputted via the microphone 30. The microphone 30 is configured to be more compact.

Figure 3:
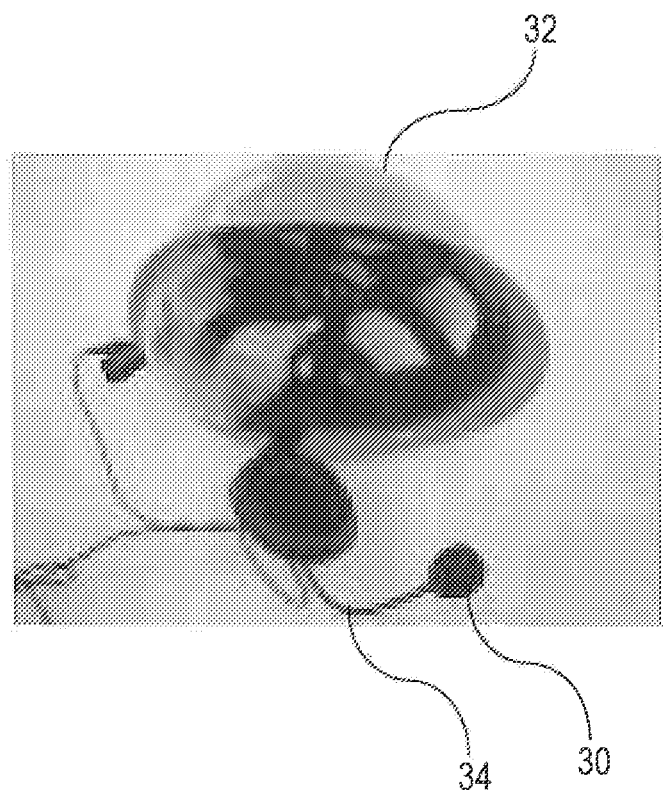
FIG. 3 is a view showing a state of use of a microphone 30.
Figure 4:
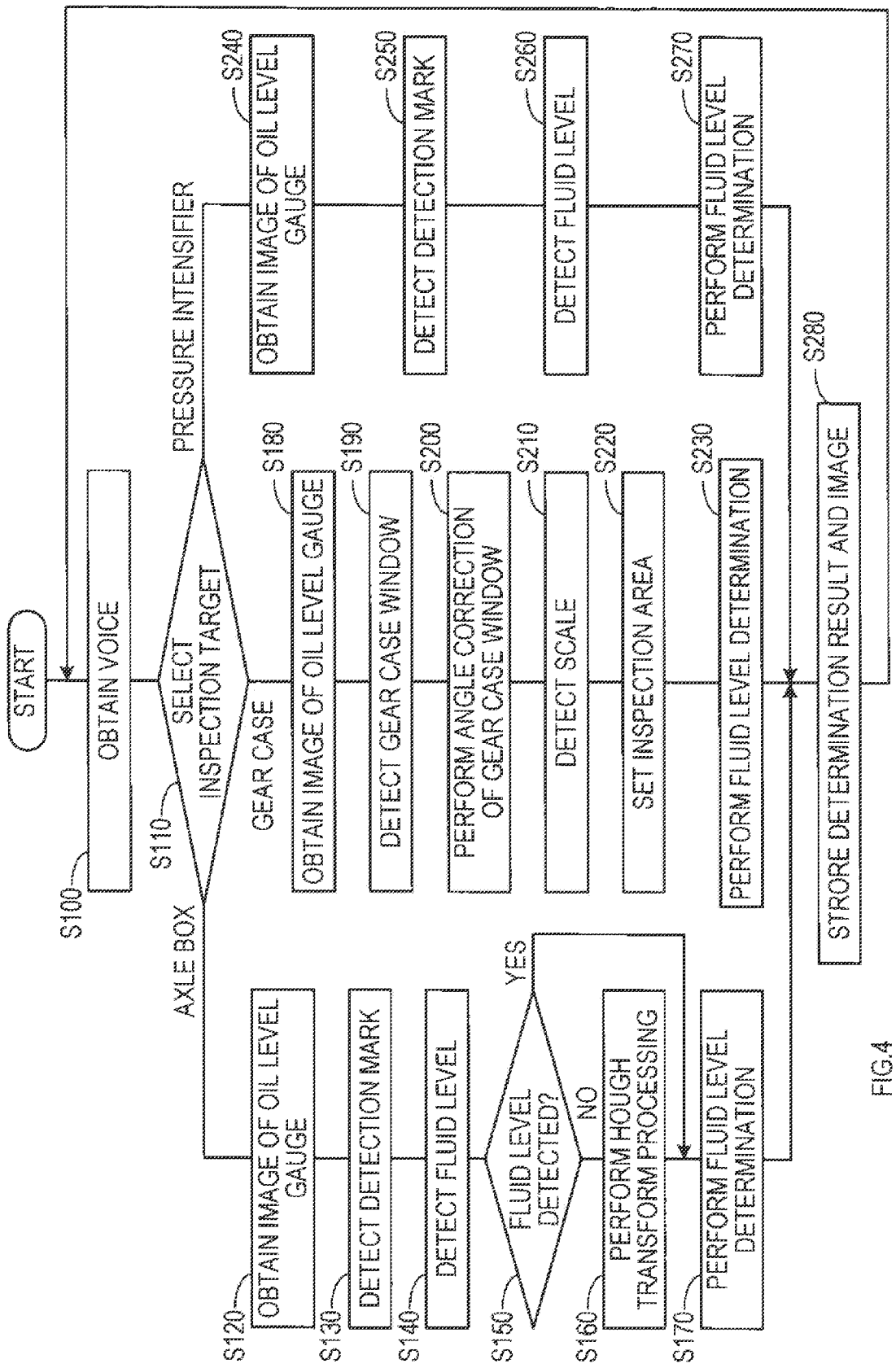
FIG. 4 is a flowchart showing a flow of a fluid level determination process.

The microphone 30 is attached to a distal end of a flexible arm 34 fixed to a side of a helmet 32 the inspector wears, as shown in FIG. 3. The arm 34 is freely bendable, and thereby the microphone 30 is capable of being positioned near the inspector's mouth.

The display unit 40 is a unit that displays the oil level inspection result, the determination result, the result of the processing, or the reason for the processing. The display unit 40 is constituted by a display of, for example, an LCD, an organic EL, or the like.

The data storage unit 50 is a mass storage unit, such as a hard disk device that stores, as data, oil level inspection results and determination results.

The keyboard 60 is a unit for inputting a keyword for searching.

The output unit 70 is a printer that outputs, as a report, at least one of the oil level inspection result, the determination result displayed by the display unit 40, and the search result searched by the controller 20.

(Fluid Level Determination Process)

Next, a description will be provided on the fluid level determination process executed by the controller 20 with reference to FIG. 4 to FIG. 12.

First, in S100, a voice of the inspector is obtained through the microphone 30. In this case, the inspector's voice should indicate one of "axle box", "gear case" and "pressure intensifier" which means each oil level gauge as an inspection target.

In subsequent S110, it is identified which inspection target the inspector's voice obtained in S100 indicates. Specifically, it is identified by voice recognition and selected which of "axle box", "gear case" and "pressure intensifier" the voice indicates.

When the selected result is "axle box" (S110: axle box), the process proceeds to S120.

When the selected result is "gear case" (S110: gear case), the process proceeds to S180.

When the selected result is "pressure intensifier" (S110: pressure intensifier), the process proceeds to S240.

In 120, an image of the oil level gauge captured with the camera 10 is obtained.

In subsequent S130, a detection mark in a center of the image is detected by image processing from the image of the oil level gauge obtained in S120.

The detection is performed by searching for the mark in the image of the oil level gauge based on a detection mark image previously registered in the ROM or RAM. Specifically, as shown in FIG. 5A, a mark image (a mark represented by 102 in FIG. 5A) which is identical with the detection mark image is detected in a mark detection area (an area within a square represented by 101 in FIG. 5A).

Figure 5B:
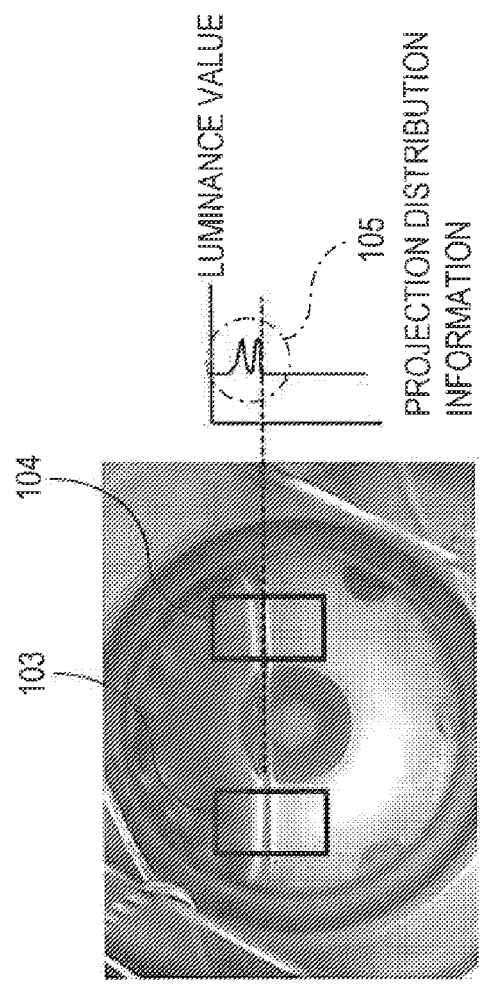
FIGS. 5A-5B are views showing a procedure of detecting a detection mark.
Figure 5A:
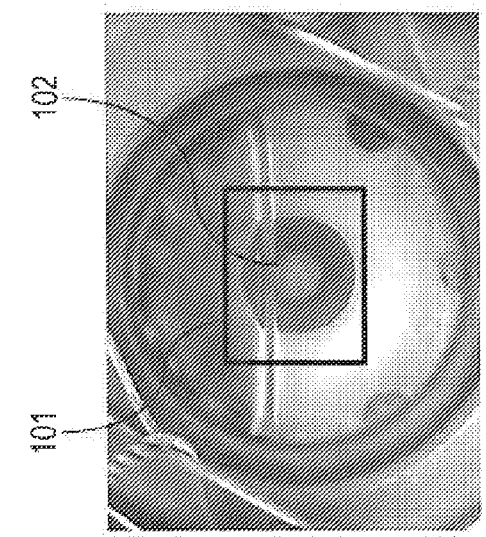

In subsequent S140, fluid level inspection areas (areas within squares represented by 103, 104 in FIG. 5B) of lubricant oil are set on both right and left sides of the detection mark as shown in FIG. 5B, based on a position of the detection mark detected in S130.

After setting the fluid level inspection areas 103, 104, as shown in FIG. 5B, projection distribution information of luminance values in the areas are used to detect a position (a region represented by 105 in FIG. 5B) at which the information (luminance value) drastically changes, and the position is determined as a fluid level.

In this case, even when tilted, the fluid level is determined as the fluid level without performing angle correction of the fluid level to be horizontal. This is because there are relatively rare cases where the fluid level of the actually captured image of the oil level gauge is tilted, as well as because performing angle correction requires a substantial processing time for angle correction. When needed, angle correction may be performed. Specifically, the angle correction may be performed in a same manner as angle correction of the gear case described in after-mentioned S200.

In subsequent S150, it is determined whether or not the fluid level has been detected in S140.

The oil level gauge has a glass or acrylic window (a check window), and the fluid level sometimes cannot be detected in S140 due to a flaw or an oil spot on the check window. This is why it is determined whether or not the fluid level has been detected.

When the fluid level has been detected (S150: Yes), the process proceeds to S170.

When the fluid level has not been detected (S150: No), the process proceeds to S160.

In S160, a Hough transform is performed. Hough transform means a processing to detect a straight line which passes a largest number of information points appearing on the image.

Figure 6C:
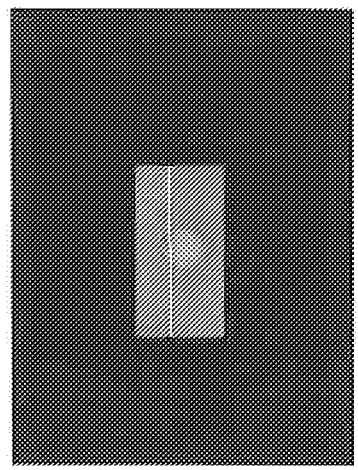
FIGS. 6A-6C are views showing a procedure of a Hough transform.
Figure 6B:
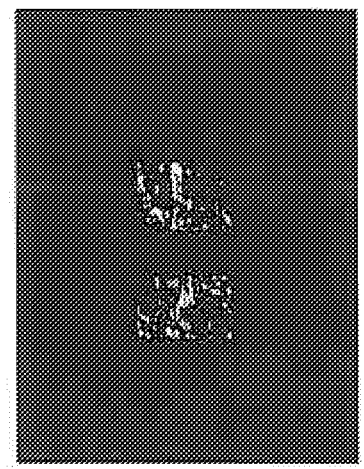
Figure 6A:
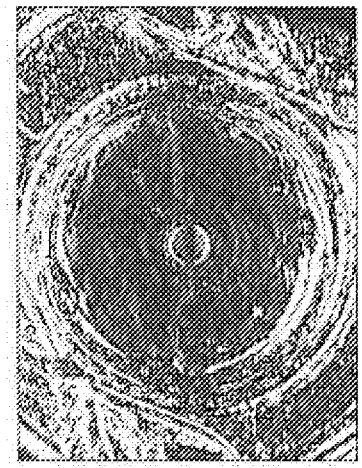

Specifically, an edge emphasis processing is performed to the image of the oil level gauge obtained in S120, as shown in FIG. 6A. Subsequently, a binary processing is performed as shown in FIG. 6B.

Then, a straight line is detected as shown in FIG. 6C by utilizing that information points (edges) are localized in a fluid level area in a binary image shown in FIG. GB, and the straight line is regarded as the fluid level.

In S170, fluid level determination is performed as shown in below (1) and (2) (see FIG. 7).

(1) When fluid levels (fluid levels represented by 111, 112 in areas in squares in FIG. 7) of both the right and left sides of the detection mark are outside a reference range (outside areas represented by 113, 115 in FIG. 7), a fail is determined.

(2) When fluid levels of both the right and left sides of the detection mark are within the reference range (in an area represented by 114 in FIG. 7), or a fluid level of either the right or left side is within the reference range (in the area represented by 114 in FIG. 7), a pass is determined.

Next, in a case where gear case is selected in S110, the image of the oil level gauge captured by the camera 10 is obtained in S180.

Figure 8B:
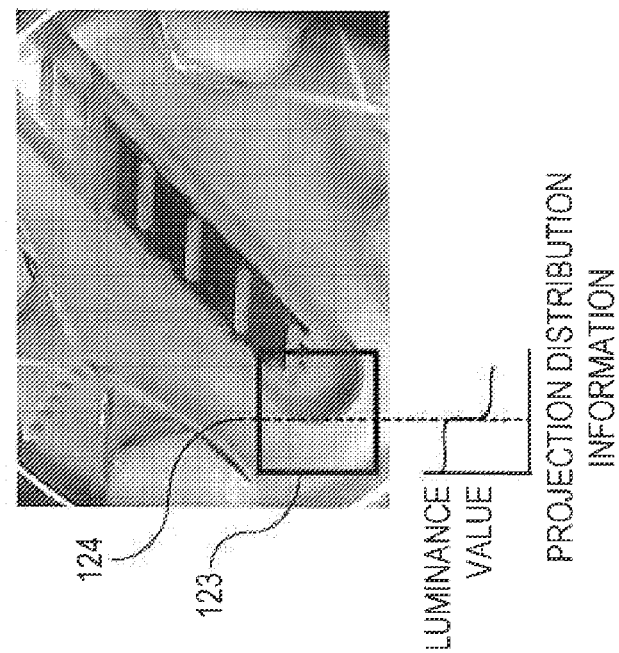
FIGS. 8A-8B are views showing a procedure of detecting a position of a gear case window of an oil level gauge in a gear case.
Figure 8A:
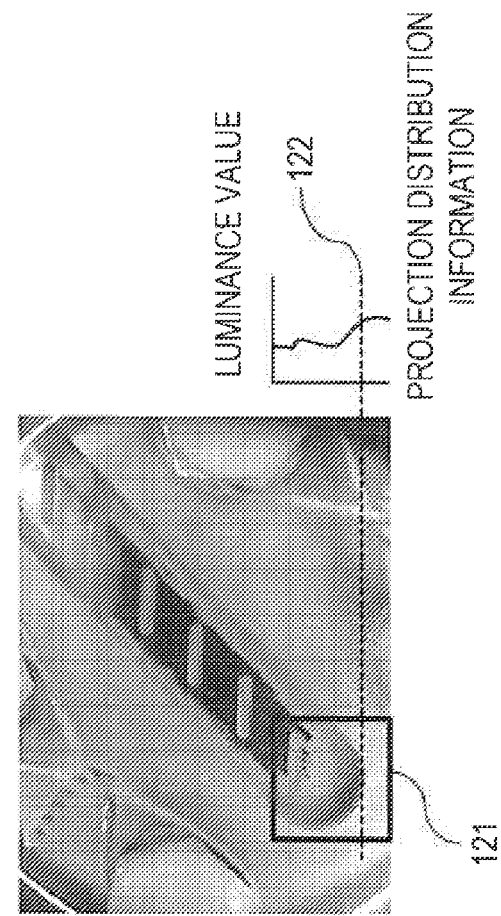

In subsequent S190, a gear case window is detected. Specifically, as shown in FIG. 8A and FIG. 8B, an information changing point in projection distribution information is detected in each of a detection area below the window (an area in a square represented by 121 in FIG. 8A) and a detection area left of the window (an area in a square represented by 123 in FIG. 8B).

Then, positions of the gear case window (a position indicated by a broken line 122 in FIG. 8A and a position indicated by a broken line 124 in FIG. 8B) are detected based on the detected information changing points.

In subsequent S200, angle correction of the gear case window is performed. Specifically, an ellipse equivalent to an object's shape (a shape of the gear case window) is generated (see FIG. 9) based on the projection distribution information of the detected image of the gear case window obtained in S190. Then, an angle ($\theta$) of the gear case window is detected as shown in FIG. 9.

The image of the gear case window is rotated in accordance with a difference between the detected angle ($\theta$) and a reference angle of 45°, to thereby perform an angle correction such that the angle of the image of the gear case window is equal to the reference angle of 45° (see FIG. 9).

In subsequent S210, a scale of the gear case window is detected. Specifically, as shown in FIG. 10A, the image of the oil level gauge obtained in S180 is searched for using, as reference positions, the positions obtained in S180 (the position indicated by the broken line 122 and the position indicated by the broken line 124 in FIG. 10A) and a scale detection area (an area in a square represented by 131 in FIG. 10A), based on an image of a scale of the gear case window previously registered in the ROM or RAM. As shown in FIG. 10B, a point (a position of a x mark represented by 132 in FIG. 10B) of the same image of the scale is detected.

In subsequent S220, respective inspection areas (an area 141, an area 142, an area 143 in FIG. 11) are set as shown in FIG. 11 based on the position of the scale detected in S210.

In subsequent S230, fluid level determination is performed. Specifically, a lowest luminance value having a predetermined value or more in each of the inspection areas set in S220 is calculated, and determinations specified as (3)-(6) below are performed, to thereby determine an oil level.

(3) a lowest luminance in the area 142<a determination luminance, as well as a lowest luminance in the area 141≥the determination luminance: pass the inspection (see FIG. 12A)

(4) a lowest luminance in the area 142<the determination luminance, as well as a lowest luminance in the area 141<the determination luminance: fail the inspection (see FIG. 12B)

(5) a highest luminance in the area 142>the determination luminance, as well as a highest luminance in the area 143<the determination luminance: pass the inspection (see FIG. 12C)

(6) a highest luminance in the area 142>the determination luminance, as well as a highest luminance in the area 143≥the determination luminance: fail the inspection (see FIG. 12D)

Next, when "pressure intensifier" is selected in S110, the process proceeds to S240, and an image of the oil level gauge captured by the camera 10 is obtained. Subsequent processings in S250, S260 and S270 are the same as the processings in S130, S140 and S170, respectively. In other words, when "pressure intensifier" is selected, no Hough transform is performed.

In S280, the result of the fluid level determination performed in S170, S230 or S270 as well as images of the oil level gauge obtained in S120, S180 and S240 are stored in the data storage unit 50, and then the process returns to S100 and the fluid level determination process is repeated.

(Output of Inspection Results)

Next, an explanation will be provided on a report when outputting results of the inspection of the oil level gauge obtained through the fluid level determination process or the voice recognition process (hereinafter, the "result of fluid level inspection process" and the "determination result" are also collectively referred to as simply the "inspection results"), the result of the processing and the reason for the processing based on the inspection results, or the result of search of inspection result data stored in the data storage unit 50.

Figure 13:
FIG. 13 shows an example of a report (check sheet) to be outputted.

The report is called a check sheet. As shown in FIG. 13, the report (check sheet) contains images of the oil level gauges obtained by the camera 10 and inspection results of oil levels indicated by marks "V", with respect to eight axle boxes, four gear boxes, and four pressure intensifiers of the railroad car truck.

In FIG. 13 with respect to, for example, the axle boxes (in a left half part of FIG. 13), a triple ellipse represents the oil level gauge of the axle box. When an oil level is normal, the oil level should be positioned in a black circular portion in a center of the triple ellipse.

In FIG. 13, the mark "V" is indicated between an upper limit and a lower limit with respect each of all the eight oil level gauges No. 1-No. 8. This means that the oil level is normal.

With respect to the oil level gauge No. 2, a mark "Z" is indicated. This means a result of a processing that lubricant oil is drained.

With respect to the oil level gauge No. 5, a mark "Y" is indicated. This means a result of a processing that lubricant oil is fed. Also, a mark "Δ" is indicated in "reason for oil feed". This represents a reason for the processing that oil is fed at the time of replacing the oil level gauge.

(Feature of Railroad Car Truck Oil Level Inspection System 1)

In the above described railroad car truck oil level inspection system 1, the inspection result of the oil level (the oil level inspection result) in each part of the railroad car obtained by image processing the image of the oil level gauge obtained by the camera 10, and the determination result based on the visual inspection result of the oil level by an inspector are displayed on the display unit 40 and are also stored in the data storage unit 50.

Accordingly, an oil level inspection by image processing and a determination by an inspector's visual inspection are performed for one oil level gauge. That is, one oil level gauge is inspected by two inspection methods, and thus an improved inspection accuracy may be achieved.

Also, since the oil level inspection result, the determination result, the result of the processing or the reason for the processing is displayed on the display unit 40, the inspector may confirm the oil level inspection result, the determination result, the result of the processing or the reason for the processing. Accordingly, if the inspection result by image processing and the visual inspection result are different, it may be possible, upon review of the displayed inspection results, to obtain an image of the oil level gauge or perform a visual inspection again. Thus, errors in inspection results may be suppressed.

Further, the oil level inspection result, the determination result, the result of the processing and the reason for the processing are stored in the data storage unit 50, it may be possible to save the inspector's labor of filling in the inspection result in a check sheet or the like. Also, the inspector no longer needs to have a check sheet when performing an inspection, and thus the inspector's burden may be reduced and an improved working efficiency may be achieved.

Moreover, since inspection records are stored as data, use of paper may be reduced and data search may be easily achieved by performing a search of stored data.

Since it is possible to perform a keyword search of a tremendous volume of data of the oil level inspection results, the determination results, the results of the processings and the reasons for the processings stored in the data storage unit 50 and display a search result on the display unit 40, confirmation of inspection results after performing an inspection may be facilitated. That is, the oil level inspection results, the determination results, the results of the processings and the reasons for the processings may be easily searched and effectively used also after performing an inspection, and thus an improved working efficiency may be achieved.

Also, it is possible to output, as a report, the oil level inspection result, the determination result, or the search result, which is convenient.

The report outputted by the output unit 70 is in a form of a so-called checklist indicating pass/fail of the inspection result with an added image of the oil level gauge. Since not only the inspection result of pass/fail but also the image remains as evidence, the report may be an effective material after the inspection.

Since the camera 10 includes, around the periphery of the lens, the diffusion ring 12 which deflects and diffuses an incident light, the incident light on the lens of the camera 10 is diffused by the diffusion ring 12. Accordingly, it may be possible to provide even and sufficient lighting on the entire oil level gauge, and thus to obtain an image with an even brightness suitable for image processing.

Further, the camera 10 includes, in the side of the body of the camera 10, the display portion 14 to display a captured image in a tilted manner relative to the side of the body. Accordingly, the inspector may obtain an image of the oil level gauge while .viewing the image of the oil level gauge displayed on the display portion 14 even in a location with little easiness in operation. Thus, it may be possible to obtain an image of the oil level gauge suitable for image processing. In addition, an improvement of easiness in operation may lead to a reduced burden on the inspector.

[Second Embodiment]

Figure 14:
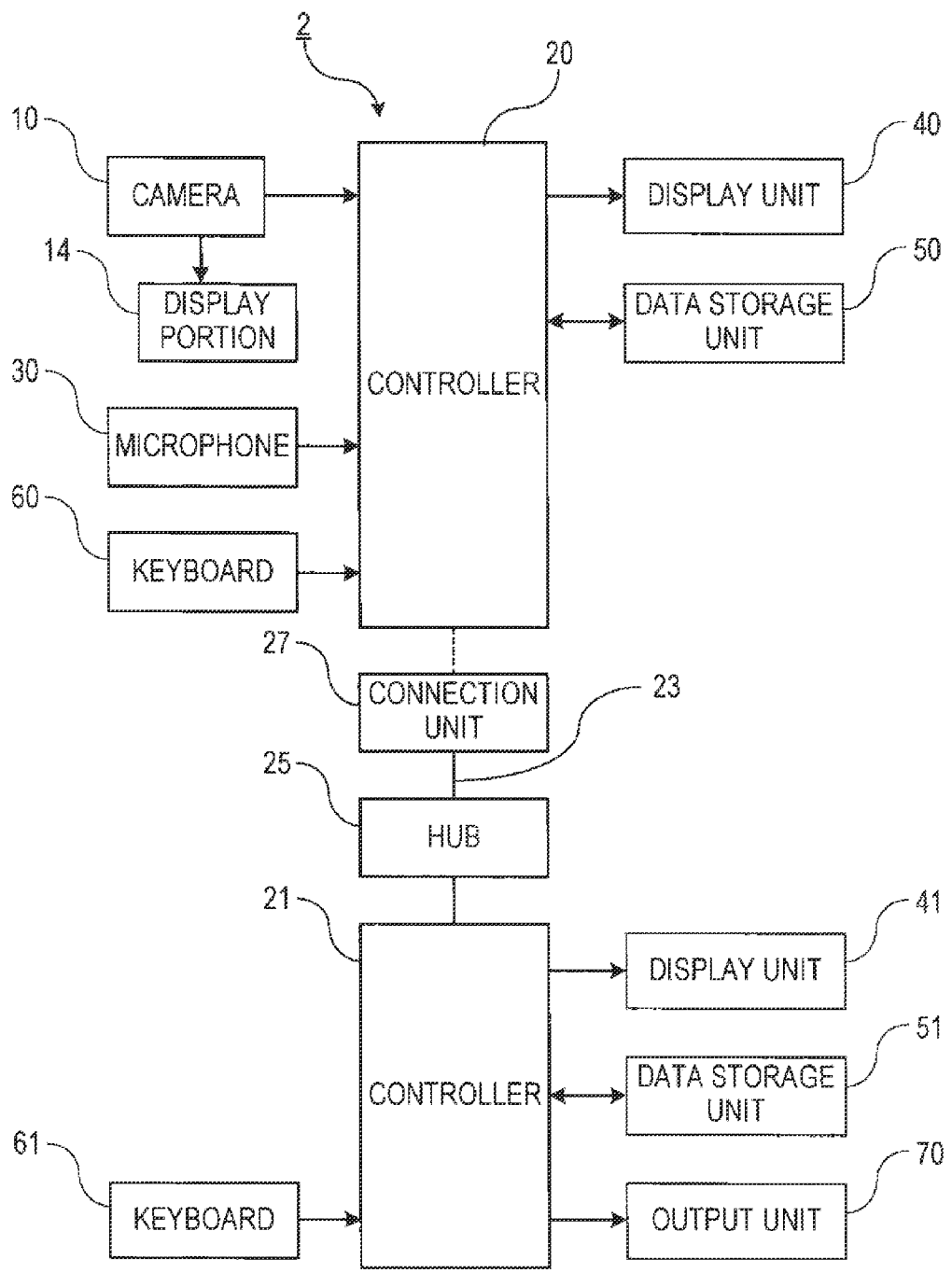
FIG. 14 is a block diagram showing a schematic configuration of a railroad car truck oil level inspection system 2.

As shown in FIG. 14, a railroad car truck oil level inspection system 2 in a second embodiment includes a controller 21, a HUB 25, a connection unit 27, a display unit 41, a data storage unit 51, and a keyboard 61 in addition to the configuration in FIG. 1.

The controller 21 serves part of functions of the controller 20.

The display unit 41 may display part of contents to be displayed on the display unit 40.

The data storage unit 51 serves part of functions of the data storage unit 50.

The keyboard 61 has the same function as the keyboard 60.

The output unit 70 is connected to the controller 21 instead of the controller 20.

The controller 20 and the controller 21 are communicably connected with each other via a USB cable 23, a HUB 25 and the connection unit 27 called a cradle.

In the controller 20, the fluid level determination process in (a) and the voice recognition process in (b) are performed among the processes (a) to (e) in the first embodiment. Data representing results of the processes are transmitted to the controller 21 via the USB cable 23, the HUB 25 and the connection unit 27.

In the controller 21, the searching process in (d) and the report output process in (e) are performed among the processes (a) to (e) in the first embodiment.

Figure 15B:
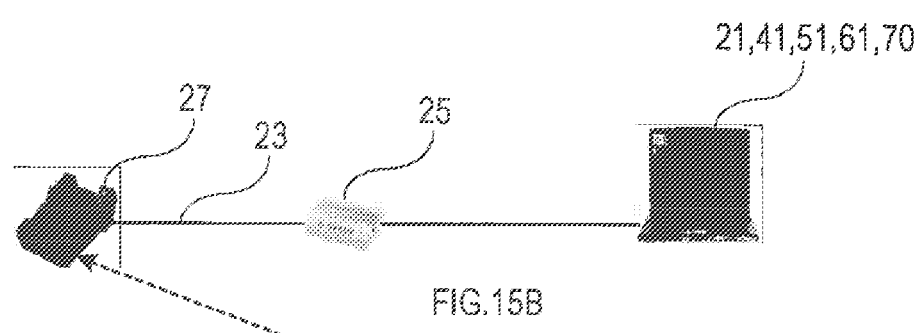
FIGS. 15A-15B are appearance views showing an appearance of the railroad car truck oil level inspection system 2.
Figure 15A:
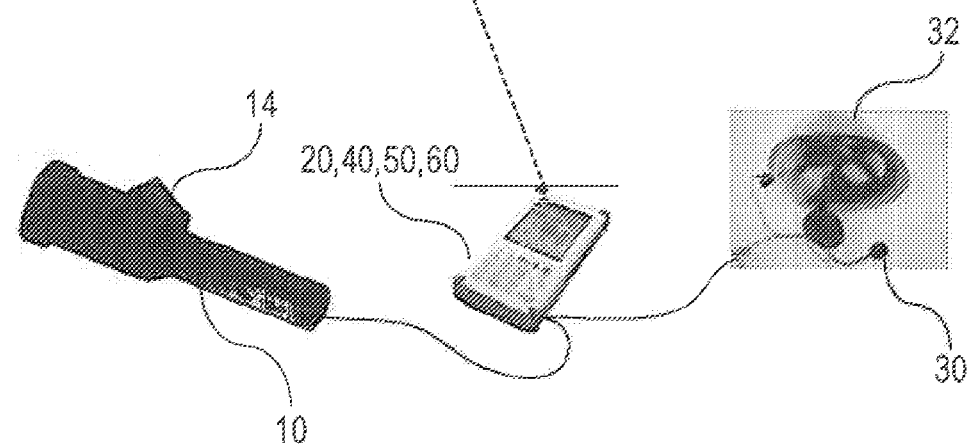

The railroad car truck oil level inspection system 2 described above may be a compact system constituted by a group of components including the controller 20 as a main component as shown in FIG. 15A. The system may be formed in a portable shape by the inspector. The system also may be downsized to thereby reduce power consumption.

Also, an operation, such as storing obtained data, searching stored data of inspection results, or outputting an inspection result as a report, which is not required to be done by the inspector during an inspection may be shared by a system of a group of components including the controller 21 as a main component as shown in FIG. 15B.

In this case, the controller 21 may be provided separately from the controller 20, and may be a high-performance one with no limitation to size or usable power source. The display unit 41 also may be configured in a larger size. Also, the data storage unit 51 may be a high-capacity storage unit. Further, the keyboard 61 and the output unit 70 may be configured to be easy to use without limitation to size. Consequently, an easy to use system may be achieved.

[Other Embodiments]

Although embodiments of the present invention have been described as above, the present invention should not be limited to the above-described embodiments but may be embodied in various forms.

(1) The oil level gauge may be an oil level gauge having a circular window with a detection mark located at a center of the window. For example, the oil level gauge may be an oil level gauge for an operating oil of a hydraulic cylinder for operating a brake.

(2) The output unit 70 may be a unit that outputs an inspection result or the like to a compact storage device, such as a USB memory, a memory card or an IC tag.

What is claimed is:

1. A railroad car truck oil level inspection system, comprising:
    an imaging unit that obtains an image of an oil level gauge provided in each part of a railroad car truck;
    an oil level inspection unit that performs image processing of the image of the oil level gauge obtained by the imaging unit, to thereby inspect whether or not an oil level in the each part of the railroad car truck is within a predetermined range;
    a voice input unit adapted for an inspector to input, via voice, an inspection result of inspecting whether or not an oil level in the each part of the railroad car truck is within the predetermined range;
    a voice processing unit that performs a voice recognition process of the inspection result inputted via the voice input unit, to thereby determine whether or not the inputted inspection result is good, and converts a determination result into displayable data;
    a display unit that displays an oil level inspection result obtained by the oil level inspection unit and the determination result obtained by the voice processing unit; and
    a storage unit that stores, as data, the oil level inspection result and the determination result converted into displayable data.

2. The railroad car truck oil level inspection system according to claim 1,
    wherein the voice input unit is further adapted to input, via voice, a result of a processing and a reason for the processing based on the inspection result by the oil level inspection unit or the inspection result by the inspector;
    wherein the voice processing unit further converts the result of the processing and the reason for the processing into displayable data;
    wherein the display unit further displays the result of the processing and the reason for the processing converted into displayable data by the voice processing unit; and
    wherein the storage unit further stores, as data, the result of the processing and the reason for the processing converted into displayable data by the voice processing unit.

3. The railroad car truck oil level inspection system according to claim 1, further comprising:
    an input unit provided to input a keyword for searching; and
    a search unit that performs a search of at least one of the oil level inspection results, the determination results, the results of the processings and the reasons for the processings stored in the storage unit based on the keyword inputted via the input unit, and displays a search result on the display unit.

4. The railroad car truck oil level inspection system according to claim 1, further comprising:
    an output unit that outputs, in a form of a report, at least one of the oil level inspection result, the determination result and the search result searched by the search unit, which are displayed on the display unit.

5. The railroad car truck oil level inspection system according to claim 1, wherein the imaging unit includes a diffusion ring that deflects and diffuses an incident light around a periphery of a lens.

6. The railroad car truck oil level inspection system according to claim 5, wherein the imaging unit has a display portion in a side of a body of the imaging unit to display a captured image in a tilted manner relative to the side of the body.

* * * * *